3,452,053
Patented June 24, 1969

3,452,053
ALKYL - N' - (5-NITRO-2-FURYLIDENE)-N-(SUBSTITUTED CARBAMOYL)-HYDRAZINO ACETATES
Cornelis van der Stelt and Petrus S. Hofman, Haarlem, Netherlands, assignors to N.V. Koninklijke Pharmaceutische Fabrieken v/h Brocades-Stheeman & Pharmacia, Amsterdam, Netherlands
No Drawing. Filed Jan. 27, 1966, Ser. No. 523,279
Claims priority, application Great Britain, Jan. 27, 1965, 3,670/65
Int. Cl. C07d 5/30; A61k 27/00
U.S. Cl. 260—347.4     4 Claims

ABSTRACT OF THE DISCLOSURE
Compounds of the formula

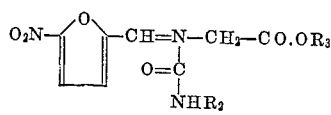

wherein $R_2$ is a lower alkoxycarbonyl, cyclohexyl or phenyl group, and $R_3$ is an alkyl group containing 1 to 4 carbon atoms. These compounds are useful intermediates in the preparation of 1-aminohydantoins which in turn possess antibacterial activity.

---

This invention relates to a process for the preparation of new N-carbamoyl-hydrazinoacetic acid esters, to certain such esters which are therapeutically useful and pharmaceutical compositions containing them. It also relates to a process for the preparation of therapeutically useful 1-aminohydantoin derivatives from the N-carbamoyl-hydrazinoacetic acid esters.

According to the present invention, N-carbamoyl-hydrazinoacetic acid esters of the formula:

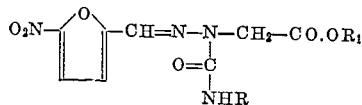

(wherein R represents a straight- or branched-chain alkyl group containing up to 8 carbon atoms, a lower alkenyl or lower alkoxy-carbonyl group, a cycloalkyl group of 5 to 8 carbon atoms, phenyl or phenyl carrying one or two lower alkyl substituents, or a phenyl-(lower) alkyl group, and $R_1$ represents a hydrocarbon group) are prepared by the process which comprises reacting a 2-hydrazinoacetic acid ester of the formula:

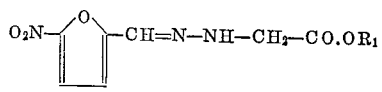

(wherein $R_1$ is an hereinbefore defined and is preferably an alkyl group containing up to 4 carbon atoms, e.g. methyl or ethyl, or an aralkyl group containing up to 4 carbon atoms in the alkyl moiety, e.g. benzyl) with an organic isocyanate of the formula R—NCO (wherein R is as hereinbefore defined) in solution in an anhydrous inert organic medium. In this specification and accompanying claims the term "lower" as applied to alkyl, alkenyl and alkoxy groups means that the group in question contains at most 6 carbon atoms.

A suitable organic solvent medium for the reaction between the 2-hydrazinoacetic acid ester and the organic isocyanate is an ether, e.g. a dialkyl ether (preferably diethyl ether) tetrahydrofuran or dioxan, or an aromatic hydrocarbon, e.g. benzene. The reaction rate and also the yield of the desired product of Formula I is increased when the reaction is carried out in the presence of a catalytic amount of a strong mineral acid, for example hydrochloric or hydrobromic acid. It is usually possible to obtain yields of the N-carbamoylhydrazinoacetic acid ester greater than 60%.

The new class of compounds of Formula I are useful as intermediates in the preparation of therapeutically useful 1-aminohydantoin derivatives by a hitherto unknown method. The method, which is a feature of the invention, comprises effecting ring closure (cyclization) of the N-carbamoylhydrazino-acetic acid esters of Formula I by treatment with a strong mineral acid to yield a 1-aminohydantoin derivative of the formula:

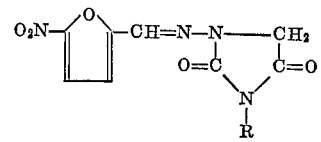

wherein R is as hereinbefore defined. The cyclization is preferably effected with hydrochloric, hydrobromic or sulphuric acid in the absence or presence of acetic acid. The quantity of acid or acids required depends on the solubility of the N-carbamoyl-hydrazinoacetic acid ester.

1-aminohydantoin derivatives of Formula III in which R represent an alkyl group (preferably staright chain alkyl group) containing 1 to 4 carbon atoms or a cyclohexyl group are new compounds and, as such, are a feature of the invention. They possess antibacterial properties, for example against Pseudomonas aeruginosa, Escherichia coli, Aerobacter aerogenes, Proteus vulgaris, Salmonella typhimurium, Salmonella B. and C., Shigella sonnei, Staphylococcus aureus, Streptococcus faecalis, Pyocyaneus and Enterococcus. Of particular importance is the compound of Formula III in which R represents methyl, i.e. 1-(5-nitro-2-furfurylideneamino)-3-methylhydantoin, which has been found in in vitro tests to be generally as active an active an antibacterial agent as the known compound nitrofurantoin, i.e. 1-(5-nitro-2-furfurylideneamino)hydantoin. The compound of Formula III in which R represents butyl possesses fungistatic propetries, for example against Candida albicans, in addition to antibacterial activity.

The N-carbamoyl-hydrazinoacetic acid esters of Formula I in which R is a lower alkyl (preferably straight chain alkyl) group, a lower alkoxycarbonyl, cyclohexyl or phenyl group, and $R_1$ is an alkyl group containing 1 to 4 carbon atoms, besides being useful as intermediates for 1-aminohydantoin derivatives, are also useful as antibacterial agents against, for example, the same bacteria affected by the 1-aminohydantoin derivatives of Formula III as hereinbefore specifically mentioned. Preferred esters are those of 2-N'-(5-nitro-2-furfurylidene)-N-methylcarbamoyl-hydrazinoacetic acid and the corresponding N-ethyl, N-propyl, N-butyl, N-hexyl, N-ethoxycarbonyl, N-cyclohexyl and N-phenyl acids, and more particularly the ethyl esters of these acids. Of outstanding importance is ethyl 2-N'-(5-nitro-2-furfurylidene)-N-methylcarbamoylhydrazinoacetate which in in vitro tests has shown itself to be more active against Staphylococcus aureus, Escherichia coli, Salmonella typhimurium and Shigella sonnei than nitrofurantoin.

The aforesaid therapeutically active N-carbamoylhydrazinoacetic acid esters which conform to the formula:

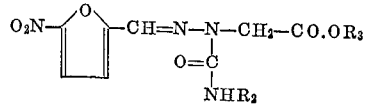

(wherein $R_2$ represents a lower alkyl, lower alkoxycarbonyl, cyclohexyl or phenyl group, and $R_3$ represents an alkyl group containing 1 to 4 carbon atoms) may also be prepared, according to further features of the invention, by the following methods:

(1) Reaction of 5-nitrofurfural with a compound of the formula:

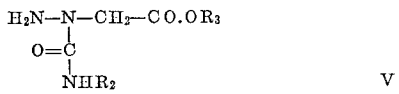

wherein $R_2$ and $R_3$ are as hereinbefore defined. The reaction is preferably effected in an inert aqueous-organic solvent medium, for example with an alcohol, such as ethanol, with or without heating.

The compounds of Formula V can be obtained by hydrolysis of compounds of the formula:

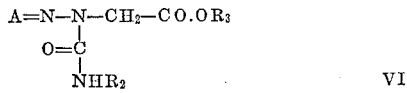

wherein A = represents isopropylidene or benzylidene and $R_2$ and $R_3$ are as hereinbefore defined. The reaction is carried out in a weakly acid medium, with or without heating, and preferably in the same solvent medium as above. In case the same solvent is used isolation of the compounds of Formula V from the reaction mixture is not necessary and even 5-nitorfurfural may be added directly to the acid solution of the reactants according to Formula VI. Acids suitable for this reaction are for example diluted hydrochloric or hydrobromic acid or acetic acid.

The starting compounds of Formula VI may be prepared by one of the following methods:

(a) Reaction of an organic isocyanate of the formula $R_2$—NCO (wherein $R_2$ is as hereinbefore defined) in solution in an anhydrous inert organic medium, for example tetrahydrofuran, dioxan or benzene, with a 2-hydrazino acetic acid ester of the formula:

$$A = N - NH - CH_2 - CO.OR_3 \quad VII$$

(wherein A and $R_3$ are as hereinbefore defined). The reaction rate and also the yield of the desired product is increased when the reaction is carried out in the presence of catalytic amount of a strong mineral acid, for example hydrochloric or hydrobromic acid.

(b) Reaction of compounds of Formula VII with a carbamoyl halide of the formula HalCONHR$_2$ wherein Hal represents a halogen (preferably chlorine) atom and $R_2$ is as hereinbefore defined. The reaction is preferably effected in an anhydrous inert organic solvent medium, for example tetrahydrofuran, dioxan or benzene.

(c) Reaction of a semicarbazone of the formula:

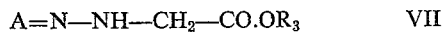

(wherein A and $R_2$ are as hereinbefore defined) with a chloroacetic acid ester of formula ClCH$_2$—CO.OR$_3$ (wherein $R_3$ is as hereinbefore defined) in a substantially anhydrous solution containing an alkaline condensation agent (preferably an alkali metal alkoxide such as sodium methoxide or ethoxide), and carefully acidifying the reaction mixture with, for example, sulphuric acid.

(d) Reaction of compounds of Formula VII with phosgene to form an intermediate of the formula:

(wherein A and $R_3$ are as hereinbefore defined) and reaction of that intermediate with a primary amine $R_2NH_2$, wherein $R_2$ is as hereinbefore defined. This reaction, which may be carried out with or without isolation from the reaction mixture of the intermediates of Formula IX, is preferably conducted in an inert organic solvent medium, for example tetrahydrofuran or dioxan.

(e) Reaction of compounds of the formula:

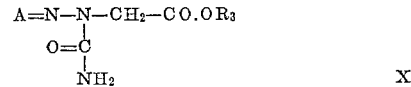

(wherein A and $R_3$ are as hereinbefore defined) with a halide Hal-R$_2$ (wherein $R_2$ represents a lower alkyl or cyclohexyl group and Hal represents a halogen, preferably bromine or iodine, atom) in the presence of sodium. The reaction is preferably effected in an anhydrous inert organic solvent medium for example an ether such as diethyl ether, tetrahydrofuran or dioxan.

(2) Reaction of compounds of the formula:

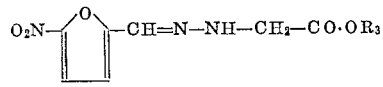

(wherein $R_3$ is as hereinbefore defined) with a carbamoyl halide of the formula HalCONHR$_2$ wherein Hal represents a halogen (preferably chlorine) atom and $R_2$ is as hereinbefore defined. The reaction is preferably effected in an anhydrous inert organic solvent medium, for example tetrahydrofuran, dioxan or benzene.

(3) Reaction of compounds of the Formula XI with phosgene to form an intermediate of the formula:

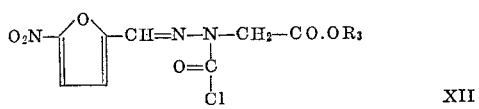

(wherein $R_3$ is as hereinbefore defined) and reaction of that intermediate with a primary amine $R_2NH_2$, wherein $R_2$ is as hereinbefore defined. This reaction, which may be carried out with or without isolation from the reaction mixture of the intermediates of Formula XII, is preferably conducted in an inert organic solvent medium, for example tetrahydrofuran or dioxan.

The following examples, in which the yields expressed are in terms of the theoretical yield, illustrate the preparation of compounds of the present invention by hereinbefore described processes.

EXAMPLE 1

4.8 g. of ethyl 2-N'-(5-nitro-2-furfurylidene)hydrazino-acetate are dissolved in 60 ml. of anhydrous tetrahydrofuran. 2.5 ml. of propylisocyanate and a trace of gaseous hydrogen chloride is introduced. The mixture is heated under reflux for 7 hours. After cooling, some ml. of ethanol are added to decompose any propylisocyanate left. The mixture is concentrated under reduced pressure and the residue dissolved in a little benzene. Eethyl 2-N'-(5 - nitro - 2 - furfurylidene)-N-propylcarbamoyl-hydrazino-acetate crystallizes upon addition of diethyl ether. The melting point of the compound is 130–131° C. after crystallization from a mixture of benzene and ether. Yield 70%.

*Analysis.*—Calculated for $C_{13}H_{18}N_4O_6$: C, 47.85%; H, 5.56%; N, 17.17%. Found: C, 48.08%; H, 5.72%; N, 17.26%.

The ethyl 2-N'-(5-nitro-2-furfurylidene)hydrazino-acetate used as a starting material can be synthesized as follows:

A mixture of 150 ml. of ethanol, 50 g. of ethyl 2-hydrazino-acetate hydrochloride, 25 g. of pyridine and 42.5 g. of 5-nitro-2-furfural is heated to 60° C. and kept at this temperature for about 10 minutes. The clear solution is poured onto a mixture of ice and water. A crystalline solid, mainly consisting of ethyl 2-N'-(5-nitro-2-furfurylidene)hydrazino-acetate is filtered off. The impure substance is obtained in a yield of 80%; melting point 89–90° C. and after crystallization from ethanol 98–99° C.

EXAMPLE II 9.6 g. of ethyl 2-N'-(5-nitro-2-furfurylidene)hydrazino-acetate are dissolved in anhydrous benzene. 3.5 ml. of ethylisocyanate and a trace of gaseous hydrogen chloride are added and the mixture is refluxed for 6 hours. The main part of the benzene is distilled off under reduced pressure and diethyl ether is added. Ethyl 2-N'-(5-nitro-2-furfurylidene) - N - ethylcarbamoyl - hydrazino-acetate which precipitates is filtered off and washed with diethyl ether. 11 g. of the product (yield 87%) are obtained, melting at 145–147° C. after crystallisation from a mixture of benzene and ether.

*Analysis*:—Calculated for $C_{12}H_{16}N_4O_6$: C, 46.15%; H, 5.16%; N, 17.94%. Found: C, 46.4%; H, 5.4%; N, 17.9%.

EXAMPLE III 4.5 g. of carbethoxyisocyanate (also called ethoxycarbonylisocyanate) are added to 10 g. of ethyl 2-N'-(5-nitro-2-furfurylidene) hydrazino-acetate in 125 ml. of anhydrous tetrahydrofuran. The mixture is boiled under reflux for 2 hours, cooled and filtered. The ethyl 2-N'-(5-nitro - 2 - furfurylidene)-N-(ethoxycarbonylcarbamoyl)-hydrazino-acetate obtained is washed with diethyl ether. The filtrate is concentrated. A further crop of the desired compound precipitates upon addition of acetone and diethyl ether. Total yield is 10 g. of product (67% of the theoretical yield), melting at 185–187° C. after crystallisation from acetone.

*Analysis*.—Calculated for $C_{13}H_{16}N_4O_8$: C, 43.82%; H, 4.53%; N, 15.72%. Found: C, 43.54%; H, 4.65%; N, 15.71%.

EXAMPLE IV 9.6 g. of ethyl 2-N'-(5-nitro-2-furfurylidene)hydrazino-acetate are dissolved in 100 ml. of anhydrous tetrahydrofuran. To the solution is added 5.2 g. of cyclohexylisocyanate. A flow of gaseous hydrogen chloride is introduced over a period of one minute into 10 ml. of tetrahydrofuran, and this solution is added to the reaction mixture, which is allowed to stand overnight. The mixture is then heated under reflux for 3 hours. After cooling, some ml. of ethanol are added to decompose any cyclohexylisocyanate left. The mixture is concentrated under reduced pressure and the residue dissolved in a little benzene. Ethyl 2 - N'-(5-nitro-2-furfurylidene)-N-cyclohexylcarbamoyl-hydrazino-acetate crystallises upon addition of diethyl ether. The melting point of the compound is 147–149° C. after crystallisation from a mixture of benzene and diethyl ether. Yield 86%.

*Analysis*.—Calculated for $C_{16}H_{22}N_4O_6$: C, 52.45%; H, 6.05%; N, 15.29%. Found: C, 52.5%; H, 6.1%, N, 15.1%.

In the same way there were prepared the following compounds:

Ethyl 2 - N' - (5-nitro-2-furfurylidene)-N-methylcarbomyl-hydrazino-acetate. Yield 60%; melting point 172–174° C.

*Analysis*.—Calculated for $C_{11}H_{14}N_4O_6$: C, 44.30%; H, 4.73%; N, 18.7%. Found: C, 44.3%; H, 4.8%; N, 18.6%.

Ethyl 2 - N' - (5 - nitro-2-furfurylidene)-N-butylcarbamoyl-hydrazino-acetate. Yield 77%; melting point 134–136° C.

*Analysis*.—Calculated for $C_{14}H_{20}N_4O_6$: C, 49.41%; H, 5.92%; N, 16.46%. Found: C, 49.7%; H, 6.2%; N, 16.7%.

Ethyl 2 - N' - (5 - nitro-2-furfurylidene)-N-hexylcarbamoyl-hydrazino-acetate. Yield 54%; melting point 100–102° C.

*Analysis*.—Calculated for $C_{16}H_{24}N_4O_6$: C, 52.17%; H, 6.57%; N, 15.21%. Found: C, 52.5%; H, 6.4%; N, 14.9%.

Ethyl 2 - N' - (5-nitro-2-furfurylidene)-N-phenylcarbamoyl-hydrazino acetate. Yield 75%; melting point 167.5–169° C.

*Analysis*.—Calculated for $C_{16}H_{16}N_4O_6$: C, 53.33%; H, 4.48%; N, 15.55%. Found: C, 53.8; H, 4.7%; N, 15.4%.

Ethyl 2 - N' - (5-nitro-2-furfurylidene)-N-(2-ethylhexyl) carbamoyl-hydrazino-acetate, melting point 105–106° C.

*Analysis*.—Calculated for $C_{18}H_{28}N_4O_6$: C, 54.53%; H, 7.12%; N, 14.13%. Found: C, 54.8%; H, 7.1%; N, 14.3%.

EXAMPLE V 3 g. of ethyl 2-N'-(5-nitro-2-furfurylidene)-N-propylcarbamoyl-hydrazino-acetate (obtained as described in Example I) is introduced into 50 ml. of concentrated hydrochloric acid and the mixture is boiled for about 10 minutes. Upon cooling 1-(5-nitro-2-furfurylidene-amino)-3-propylhydantoin precipitates. The melting point is 189–190° C. after crystallisation from a mixture of dioxan and benzene. Yield 75%.

*Analysis*.—Calculated for $C_{11}H_{12}N_4O_5$: C, 47.15%; H, 4.32%; N, 19.99%. Found: C, 47.0%; H, 4.2%; N, 19.5%.

EXAMPLE VI 3 g. of ethyl 2-N'-(5-nitro-2-furfurylidene)-N-ethyl-carbamoyl-hydrazino-acetate (obtained as described in Example II), 25 ml. of concentrated hydrochloric acid and 1.5 ml. of acetic acid are boiled under reflux for 15 minutes. 1-(5-nitro-2-furfurylideneamino)-3-ethylhydantoin, M.P. 207–209° C., is obtained upon addition of water and cooling in an ice bath. Yield 60%.

*Analysis*.—Calculated for $C_{10}H_{10}N_4O_5$: C, 45.12%; H, 3.79%; N, 21.05%. Found: C, 45.0%; H, 3.7%; N, 20.8%.

In the same way but starting with ethyl 2-N'-(5-nitro-2 - furfurylidene)-N-cyclohexylcarbamoyl - hydrazino-acetate and using 5 ml. of concentrated hydrochlorid acid and 20 ml. of acetic acid there was prepared in a yield of 40% 1-(5-nitro-2-furfurylidene amino) 3-cyclohexylhydantoin, M.P. 239–241° C.

*Analysis*.—Calculated for $C_{14}H_{16}N_4O_5$: C, 52.5%; H, 5.04%; N, 17.49%. Found: C, 52.6%; H, 5.2%; N, 17.2%.

EXAMPLE VII

A mixture of 5 g. of ethyl 2-N'-(5-nitro-2-furfurylidene)-N-methylcarbamoyl-hydrazino-acetate (obtained by the procedure of Example IV), 12.5 ml. of acetic acid and 17 ml. of concentrated hydrochloric acid is boiled gently during 15 minutes; ethyl acetate and some hydrogen chloride escape from the reaction mixture. On cooling and adding 200 ml. of water to the solution, 1-(5-nitro-2-furfurylidene-amino)-3-methylhydantoin precipitates. Melting point after crystallisation from dioxan and dimethylformamide is 235–2377° C. Yield 80%.

*Analysis*.—Calculated for $C_9H_8N_4O_5$: C, 42.87%; H, 3.20%; N, 22.2%. Found: C, 42.9%; H, 3.3%; N, 22.1%.

EXAMPLE VIII

A mixture of 12 g. of ethyl 2-N'-(5-nitro-2-furfurylidene)-N-butylcarbamoyl-hydrazino-acetate (obtained by the procedure of Example IV), 30 ml. of acetic acid and 10 ml. of concentrated hydrochloric acid is taken to the boiling point over a period of 15 minutes. The mixture is then poured onto ice and some ml. of diethyl ether. The solid is removed by filtration under suction and washed with water and diethyl ether to give 1-(5-nitro-2-furfurylideneamino)-3-butylhydantoin, M.P. 162–163° C. Yield 65%.

*Analysis*.—Calculated for $C_{12}H_{14}N_4O_5$: C, 48.98%; H, 4.8%; N, 19.04%. Found: C, 49.2%; H, 4.8%; N, 18.9%.

In the same way using ethyl 2-N-5-nitro-2-furfurylidene)-N-hexylcarbamoly-hydrazino-acetate as starting material, there is prepared 1-(5-nitro-2-furfurylidene-amino)-3-hexyldantoin, M.P. 154–155° C.

*Analysis*.—Calculated for $C_{14}H_{18}N_4O_5$: C, 52.17%; H, 5.63%; N, 177.38%. Found: C, 52.3%; H, 5.6%; N, 17.0%.

This invention includes within its scope pharmaceutical preparations containing, as the active ingredient, at least one of the therapeutically active compounds of general Formula IV or the aforesaid new 1-aminohydantoin derivatives of general Formula III in association with a pharmaceutically acceptable carrier. The preparations may take any of the forms customarily employed for administration of therapeutically active substances, but the preferred types are those suitable for oral administration and especially tablets, including sustained release tablets, pills and capsules including the substance. The tablets and pills may be formulated in the usual manner with one or more pharmaceutically acceptable diluents or excipients, for example lactose or starch, and include materials of a lubricating nature, for example calcium or magnesium stearate. Capsules made of absorbable material, such as gelatin, may contain the active substance alone or in a mixture with a solid or liquid diluent. Liquid preparations may be in the form of suspensions, emulsions, syrups or elixirs of the active substance in water or other liquid medium commonly used for making orally acceptable pharmaceutical formulations, such as liquid paraffin, or a syrup or elixir base.

The percentage of active ingredient in the pharmaceutical preparations will vary with the compound employed, the mode of administration, the intended period of treatment and the desired therapeutic effect. Generally, the preparations should normally contain at least 15% by weight of active compound in the case of oral preparations. In clinical medicine, the active ingredient for the treatment of bacterial infections will normally be administered in a quantity of 50 mg. to 400 mg. per day.

The following examples illustrate pharmaceutical preparations according to the invention.

EXAMPLE IX

Tablets weighing 125 mg. are prepared in the usual way containing the following ingredients:

|  | Mg. |
|---|---|
| Ethyl 2 - N' - (5-nitro-2-furfurylidene)-N-methylcarbamoylhydrazinoacetate | 25 |
| Calcium phosphate | 64.3 |
| Sugar | 3.1 |
| Magnesium stearate | 0.5 |
| Maize starch | 32.1 |

EXAMPLE X

Tablets weighing 125 mg. are prepared in the usual way containing the following ingredients:

|  | Mg. |
|---|---|
| 1-(5-nitro-2-furfurylideneamino)-3-methylhydantoin | 50 |
| Calcium phosphate | 46.2 |
| Sugar | 3.1 |
| Magnesium stearate | 0.5 |
| Maize starch | 25.2 |

It is intended that the appended claims cover all changes and modifications of the particular embodiments chosen for purposes of disclosure, which do not constitute departures from the spirit and scope of the invention.

What we claim and desire to secure by Letters Patent is:
1. N-carbamoyl-hydrazinoacetic acid esters of the formula:

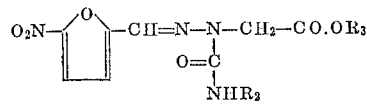

wherein $R_2$ is a lower alkoxycarbonyl, cyclohexyl or phenyl group, and $R_3$ is an alkyl group containing 1 to 4 carbon atoms.

2. Ethyl 2-N'-(5 - nitro-2-furfurylidene)-N-(ethoxycarbonyl-carbamoyl)-hydrazino-acetate.

3. Ethyl 2-N'-(5-nitro-2-furfurylidene)-N - cyclohexylcarbamoyl-hydrazino-acetate.

4. Ethyl 2-N'-(5-nitro-2-furfurylidene-N-phenylcarbamoyl-hydrazino-acetate.

References Cited

UNITED STATES PATENTS 2,610,181   9/1952   Hayes _____ 260—240

FOREIGN PATENTS 302,010   12/1963   Holland.

OTHER REFERENCES

Chemical Abstracts I, vol. 51, col. 3668 (1957) (abstract of Japanese patents 1732 to 1734).

Chemical Abstracts II, vol. 55, col. 3550 (1961) (abstract of Swirska et al.).

Chemical Abstracts III, vol. 55, cols. 11543 to 11544 (1961) (abstract of Kotulowa et al.).

Jack, J. Pharmacy and Pharmacology, vol. II, pp. 108T to 114T (1959).

Houben-Weyl, Methoden der Organischen Chemie, 4th Ed. vol. 8, pp. 116 to 117, 151 and 154 (1952).

JOHN D. RANDOLPH, *Primary Examiner.*

U.S. Cl. X.R.

260—240, 471, 482; 424—269. 278

PO-1050
(5/69)

UNITED STATES PATENT OFFICE
CERTIFICATE OF CORRECTION

Patent No. 3,452,053  Dated  June 24, 1969

Inventor(s) Cornelis van der Stelt and Petrus S. Hofman

It is certified that error appears in the above-identified patent and that said Letters Patent are hereby corrected as shown below:

In column 1, the formula appearing in the Abstract, that portion of the formula reading

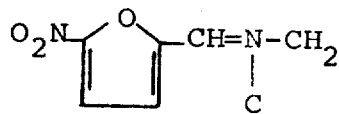   should read   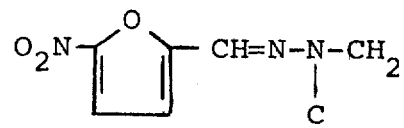

and on line 56, "an" should read -- as --. Column 2, line 25, "staright" should read -- straight --; and on line 37, after "as active" delete -- an active --; and on line 41, "etries" should read -- erties --. Column 4, line 54, "Eethyl" should read -- Ethyl --. Column 6, line 35, "hydrochlorid" should read -- hydrochloric --; and on line 52, "2377°" should read -- 237° --; and on line 69, "2-N-5" should read -- 2-N'-(5 --; and on line 70, "hexylcarbamoly" should read -- hexylcarbamoyl --; and on line 72, "hexyldantoin" should read -- hexylhydantoin --; and on line 74, "177.38%" should read -- 17.38% --.

SIGNED AND
SEALED
APR 28 1970

(SEAL)
Attest:

Edward M. Fletcher, Jr.
Attesting Officer

WILLIAM E. SCHUYLER, JR.
Commissioner of Patents